United States Patent
Cadorniga et al.

(10) Patent No.: US 6,884,181 B1
(45) Date of Patent: Apr. 26, 2005

(54) GOLF BALL AND METHOD OF MANUFACTURE

(75) Inventors: Lauro C. Cadorniga, Piedmont, SC (US); Mitchell Godfrey, Townsend, MT (US); Robin Carden, San Juan Capistrano, CA (US)

(73) Assignee: Talon Sports, San Juan Capistrano, CA (US)

( * ) Notice: Subject to any disclaimer, the term of this patent is extended or adjusted under 35 U.S.C. 154(b) by 0 days.

(21) Appl. No.: 10/130,002

(22) PCT Filed: Nov. 9, 2000

(86) PCT No.: PCT/US00/42083

§ 371 (c)(1),
(2), (4) Date: May 9, 2002

(87) PCT Pub. No.: WO01/37938

PCT Pub. Date: May 31, 2001

Related U.S. Application Data

(60) Provisional application No. 60/164,197, filed on Nov. 9, 1999.

(51) Int. Cl.[7] .............................................. A63B 37/04
(52) U.S. Cl. ...................................... 473/371; 473/374
(58) Field of Search ............................... 473/373, 374, 473/378, 385; 529/193, 274

(56) References Cited

U.S. PATENT DOCUMENTS

| | | | |
|---|---|---|---|
| 4,880,241 A | * | 11/1989 | Melvin et al. ............... 473/379 |
| 4,955,966 A | * | 9/1990 | Yuki et al. ................... 473/359 |
| 5,020,803 A | | 6/1991 | Gendreau et al. |
| 5,026,067 A | * | 6/1991 | Gentiluomo ................ 473/374 |
| 5,184,828 A | * | 2/1993 | Kim et al. ................... 473/374 |
| 5,338,038 A | | 8/1994 | Cadorniga |
| D355,943 S | | 2/1995 | Cadorniga |
| 5,470,076 A | | 11/1995 | Cadorniga |
| 5,497,996 A | | 3/1996 | Cadorniga |
| 5,508,350 A | | 4/1996 | Cadorniga et al. |
| 5,538,794 A | | 7/1996 | Cadorniga et al. |
| 5,662,530 A | | 9/1997 | Sellar |
| 5,779,561 A | * | 7/1998 | Sullivan et al. ...... 273/DIG. 22 |
| 5,971,870 A | | 10/1999 | Sullivan et al. |
| 6,004,225 A | * | 12/1999 | Owens et al. ............... 473/372 |
| 6,204,331 B1 | | 3/2001 | Sullivan et al. |

FOREIGN PATENT DOCUMENTS

| | | | |
|---|---|---|---|
| JP | 59-91973 | * | 5/1984 |
| JP | 04-312476 | * | 11/1992 |

OTHER PUBLICATIONS

International Search Report, PCT/US00/42083, 1 page, Washington, DC, May 3, 2001.

* cited by examiner

*Primary Examiner*—Glenn Caldarola
*Assistant Examiner*—Tom Duong
(74) *Attorney, Agent, or Firm*—J. Bennett Mullinax, LLC

(57) ABSTRACT

A golf ball construction (2) is provided having a solid core composition of a rubber having between 3 to 25 percent by weight of an additive selected from the group of boron carbide, silicon carbide, and/or other advanced ceramic materials, the additives providing an improved core composition. The golf ball (2) further has an improved dimple arrangement in which each dimple (20) defines a dimple edge (24) adjacent a land area (22) of the golf ball, the dimple edge having a radius between 0.050 inches to 0.250 inches. The cover (6) of the ball additionally provides a surface marking opposite a balance point of the golf ball. The balance point of the golf ball being determined by floating the golf ball and allowing the ball to assume a resting configuration within the floating solution.

5 Claims, 5 Drawing Sheets

GOLF BALL AND METHOD OF MANUFACTURE

RELATED APPLICATIONS

This application is a continuation of PCT/US00/42083 filed on Nov. 9, 2000, and which claims the benefit of US Provisional Application Ser. No. 60/164,197 filed on Nov. 9, 1999, and now abandoned.

FIELD OF THE INVENTION

This invention is directed towards golf balls and is directed more particularly to a golf ball having a unique carbide ceramic core, a unique dimple configuration, and having indicia or other markings which indicate a balance point for the golf ball.

BACKGROUND OF THE INVENTION

A significant number of conventional golf balls are made by molding a cover about a core having a typical core diameter of about 1½ inches. One form of golf ball construction includes balls having a solid core. Solid core golf balls are referred to generally as "two-piece" golf balls.

The core of a two-piece golf ball is based upon rubber compositions which are formulated to provide high hardness, high compressive strength, durability, and excellent rebound properties. Such rubber core formulations provide resiliency to the resulting golf ball which optimizes initial velocity at impact and promotes long flight distance qualities.

Polybutadiene elastomers are commonly used for the rubber component of a core and are cross linked by chemical cross-linking agents to increase the hardness while maintaining good resiliency. It is well known within the art in the manufacturing processes and formulations for which conventional two-piece golf ball cores may be manufactured. One representative patent includes U.S. Pat. No. 5,508,350 which is incorporated herein by reference. Despite advances within the art, such as represented by the above referenced patent, there remains room for improvement and variation in the art directed to core constructions which provide high initial velocity to the resulting golf ball while maintaining the durability of the core. Should the integrity of the core be compromised by cracking or other core damage, the ball will suffer a loss of initial velocity. The degradation in ball performance may be gradual and may not be immediately apparent to the user. Accordingly, cores which retain their durability will extend the useful performance life of the golf ball.

It is also known in the art to provide golf balls having a plurality of dimples or surface indentations which are more or less evenly distributed over the surface of the ball. It is well known that the dimple pattern improves and affects the flight characteristics of the ball in that the dimple shapes may vary in number and configurations.

It is further known that the dimple edges present on the face of a golf ball may have a detrimental effect on soft putting strokes. As mentioned in U.S. Pat. No. 5,662,530 which is incorporated herein by reference, a putter which contacts a dimple off center i.e., partially on a dimple edge adjacent a land area, the force of the putting stroke is not transmitted to the center of the ball. The resulting putted ball leaves the putter head at a tangent. The putting force also produces a moment about the center of the ball resulting in a small amount of spin. A small 5 degree off set from a line through the center of the ball in the direction of the putting stroke can result in a misdirection on a 4 foot putt to 2.1 inches which is sufficient to miss the cup. The missed distance from the cup is, of course, greater as the distance of the putt increases.

Accordingly, there is room for variation and improvement in the dimple pattern of a golf ball so as to minimize the amount of off-center dimple contact between the ball and the putter head while maintaining an overall dimple pattern which has good flight performance characteristics for optimized distance.

SUMMARY OF THE INVENTION

It is an object of the present invention to provide a rubber composition formulation for use as a core in a two-piece golf ball.

It is yet another object of the present invention to provide a rubber composition formulation for golf balls having a core comprised of a silicon carbide ceramic, boron carbide ceramic, or other advanced or fine ceramics such as nitride, oxide, boride, carbide, and silicide ceramics or a combination of the ceramics and/or single-phase fine ceramics thereof.

It is yet another aspect of the present invention to provide a golf ball core which has perimeter weighting of the core by the nature of the carbide ceramic additive to position itself along the perimeter of the cured core during the vulcanizing or curing process.

It is yet another feature of the present invention to provide a golf ball having a lower spin attributed to a core in which the outer perimeter of the core has a greater mass than the equivalent volume of an inner portion of the core.

It is a further aspect of the present invention to provide a one-piece, two-piece, or three-piece golf ball having a cover with a plurality of dimples, a substantial majority of each dimple having a dimple edge radius of about 0.050 to about 0.250 inches. More preferably, the dimple edge radius ranging between 0.075 to 0.150 inches and still more preferably having a dimple edges radius substantially about 0.10 inches.

It is yet another feature of the present invention to provide a two-piece golf ball having a rubber core having between 3 to 25 percent by weight and more preferably 10 to 20 percent by weight and still more preferably having about 8.5 and 9.0 per cent by weight of fine particulates additive of carbide ceramics such as silicon carbide or boron carbide. Additional useful additives may include various single-phase, fine ceramics or mixtures thereof in the polymer composition formulation of the core.

It is yet another aspect of this invention to provide a golf ball in which an indicia is positioned on the balls surface opposite the weighted end of the ball. The placement of the indicia is determined by floating golf ball in a solution having a specific gravity which will float the ball. The heaviest portion of unbalanced ball "settles" beneath the brine solution. The uppermost surface of the floating ball is then marked for subsequent labeling with an appropriate indicia. In this manner, the ball may be placed with the heaviest portion making contact with the putting green. As a result, when putted, the ball has a tendency to roll truer.

It is yet another aspect of this invention to provide a two-piece golf ball having a core composition including a perimeter weighted component of an advanced ceramic or carbide ceramic, a cover of the ball having a plurality of dimples, each dimple having a dimple edge radius of about 0.050 inches to about 0.250 inches. In addition, the ball has surface markings which are placed opposite the heaviest point of the golf ball. This combination of features provides a novel golf ball construction having ideal putting characteristics, an improved core for distance and durability, and facilitates ball placement for proper putting which takes advantage of the weight centering of the golf ball.

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DESCRIPTION OF THE PREFERRED EMBODIMENTS

Figure 1A:
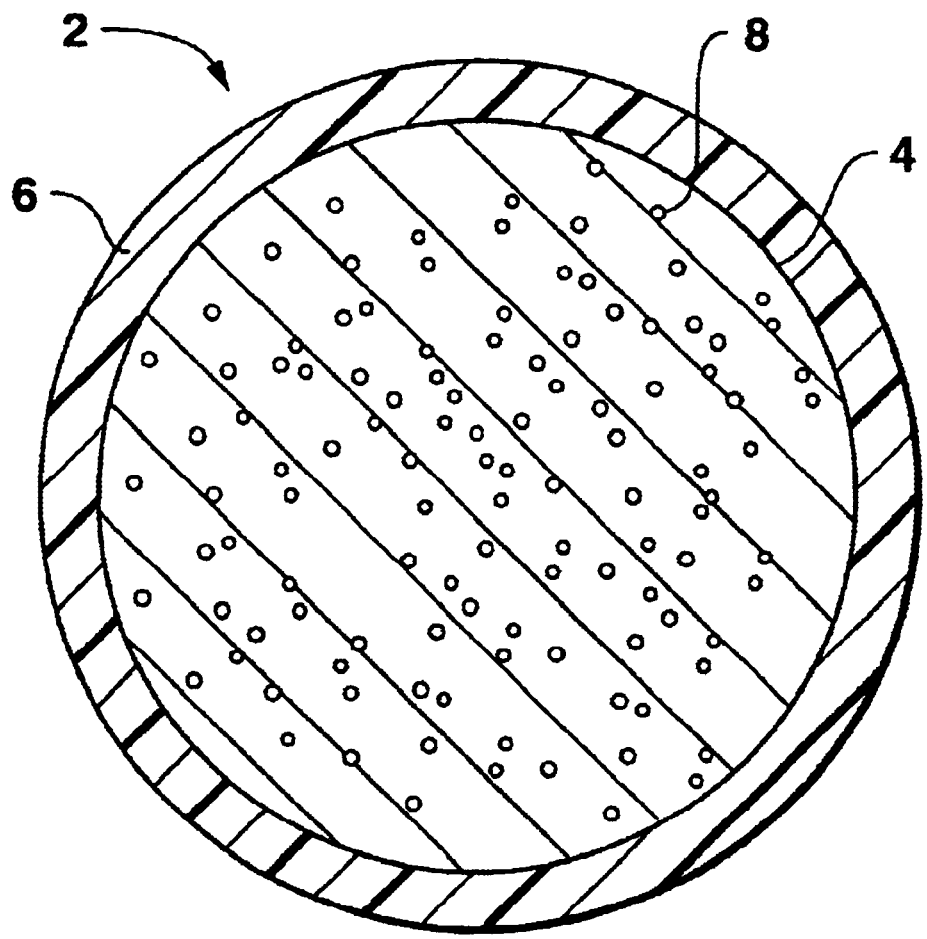
FIGS. 1A and 1B are cross section views through a two-piece golf ball illustrating different embodiments of the rubber core construction.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus or process pathway. To avoid redundancy, detailed descriptions of much of the apparatus once described in relation to a figure is not repeated in the descriptions of subsequent figures, although such apparatus or process is labeled with the same reference numbers.

The golf ball according to the present invention is produced from a polymer having high cis-polybutadiene rubber. Such polybutadiene rubber is produced from using various kinds of catalysts which are well known in the art. Additional polymers, such as natural rubber, may be added and other polymers may be added or substituted as is appreciated by one having ordinary skill in the art.

Metal salts of unsaturated carboxcylic acids are used to cross link the polymers. Suitable carboxcylic acids include methacrylic, acrylic, dimethacrylic, and diacrylic acids. Suitable metal ions include sodium, potassium, magnesium, cerium, zinc, and cadmium, with zinc being preferred.

In the present invention, a carbide ceramic such as boron carbide or silicon carbide is introduced to the polymer composition. These ceramics provide a high specific stiffness and a high Youngs modulus. Specifically, 2 to 25 percent by weight of the ceramic is introduced in the polymer mix. The ceramic is provided in the form of a fine particulate having an average particle size from about 4 microns to about 500 microns. This size also correlates to mesh sizes ranging from about 800 mesh to about a 35 mesh size of the particulate. A carbide ceramic particulate size of about 220 grit has been found useful. More preferably, the ceramic is added at a range of between 10 to 20 percent by weight; and, in one preferred composition set forth below, is present between 8.5 to 9 percent by weight. The carbide ceramic results in a core for a two-piece golf ball which has a high initial velocity property and which maintains its durability over time.

In addition to the silica carbide and boron carbide ceramics, various ceramics selected from the group of nitride, oxide, boride, carbide, and silicide ceramics may also be used to bring about an improved core formulation and resulting composition. The ceramic particulate additives serve as a damping agent to the core such that the core and associated golf ball undergoes less compression when struck with force by a club head. As a result, the golf ball returns to its initial size more quickly and contributes to a high initial velocity and accuracy of the ball.

The free radical initiator included in the core composition may be selected from a variety of known polymerization initiators. Preferably, the initiator decomposes during the cure cycle. One useful initiator set forth in the table below is dicumyl peroxide and used in amounts from about 1.0 to about 5.0 parts by weight based on 100 parts elastomer.

In the present invention, zinc oxide is used as an activator as well as a filler. Zinc oxide is present in the formulation in an amount from about 3 to about 5 parts per weight based upon 100 parts elastomer. Metal salts of unsaturated carboxaylic acid such as zinc diacrylate (ZDA) may be present in an amount of about 20–40 parts by weight based upon 100 parts elastomer.

In Table 1 set forth below one suitable composition having the carbide ceramic additives is set forth. However, it is believed that any conventional polymer composition used for the core of a two-piece ball may be used in accordance with this invention by the addition of the carbide ceramics. One having ordinary skill in the art would be able, without undue experimentation, to make adjustments to traditional fillers used in core compositions to adjust formulations to accommodate the carbide ceramics. As a general rule, it is desired to maintain the specific gravity of the core composition between 1.165 to 1.18 for a standard core diameter of 1.510±0.010 inches. As such, adjustments to weight fillers which may be used to bring about the reformulation.

TABLE 1

| Formula Material | Weight (kg) | PHR | Weight % |
|---|---|---|---|
| BR 1208 | 44.0 | 95.0 | 59.0 |
| CV 60 | 2.3 | 5.0 | 3.0 |
| Zinc diacrylate | 13.4 | 29.0 | 18.0 |
| Zinc oxide | 2.3 | 5.0 | 3.0 |

TABLE 1-continued

| Formula Material | Weight (kg) | PHR | Weight % |
|---|---|---|---|
| Zinc stearate | 1.4 | 3.0 | 2.0 |
| Barium sulphate | 4.2 | 9.0 | 5.6 |
| Boron carbide | 6.5 | 14.0 | 8.7 |
| Dicumyl peroxide | 0.5 | 1.1 | 0.7 |
| TOTAL | 74.6 | 161.1 | 100.0 |

EXAMPLE I

As seen in Table 1, the indicated amounts of a polybutadiene rubber BR1208 is combined with a natural rubber, CV60, in a Banbury or internal mixer. To this mixture, the zinc oxide and one half of the amount of zinc diacrylate (ZDA) is added, the initial mixture having a temperature of about 100° F. The material is blended for three minutes, during which time the temperature increases to 150° F.

Following the initial three minute interval, the remaining portion of the zinc diacrylate is added along with the barium sulphate and the boron carbide. Additional blending is carried out for two minutes during which time the mix temperature rises to about 170° F. At this point, zinc stearate and the dicumyl peroxide activators are added to the polymer blend along with additional mixing for about one and one-half minutes. During this latter step, the temperature rises to about 190° F. and care must be exercised that the temperatures do not exceed 195° F. Following the additional mixing of one and one-half minutes or the elevation of the temperature to 195° F., a dump cycle is carried out in which the composition is placed into a conventional drop mill.

The drop milling process brings about an immediate reduction in temperature of the polymer composition and generates thin sheets of one-quarter to one-half inch thick slabs of the core polymer mixture.

The resulting preforms of individual rubber slugs are subsequently cured by heating the compositions on the order of from about 275° F. to about 350° F. with the molding of the composition brought about simultaneously with the curing step. The molding the composition into a core structure ma be used by any conventional molding techniques such as injection, compression, or transfer molding procedures.

Following molding, the core is removed from the mold and the surface is treated by any of several techniques known in the art such as centerless grinding or surface peeling method and the like so as to facilitate adhesion of a covering composition.

The core is provided with at least one layer of a covering composition ranging in thickness from about 0.050 to about 0.250 inches and more preferably from about 0.060 to about 0.090 inches. The process to finish a golf ball with the cover is well known to those having ordinary skill in the art.

The resulting cores produced according to the present invention provide a golf ball having a high initial velocity. Further, it has been found that the durability of the core is enhanced by the carbide ceramic particulate additive such that the durability of the core is enhanced. As best seen in reference to FIG. 1A, one embodiment provides a golf ball 2 having a cover 6 and a core 4. The golf ball core has the ceramic or ceramic particulate additive 8 distributed throughout the core composition. Microscopic analysis of cores made in accordance with this invention reveal that the outer 50% radius of the core defines a gradient of the ceramic particulate additive which is 15 to 20 percent greater than the inner core region. This gradient is believed to be established during the cooling of the rubber core following molding. The resulting gradient is believed to contribute to the useful properties of the core and resulting golf ball and provide additional benefits of a perimeter weighted ball.

Figure 1B:
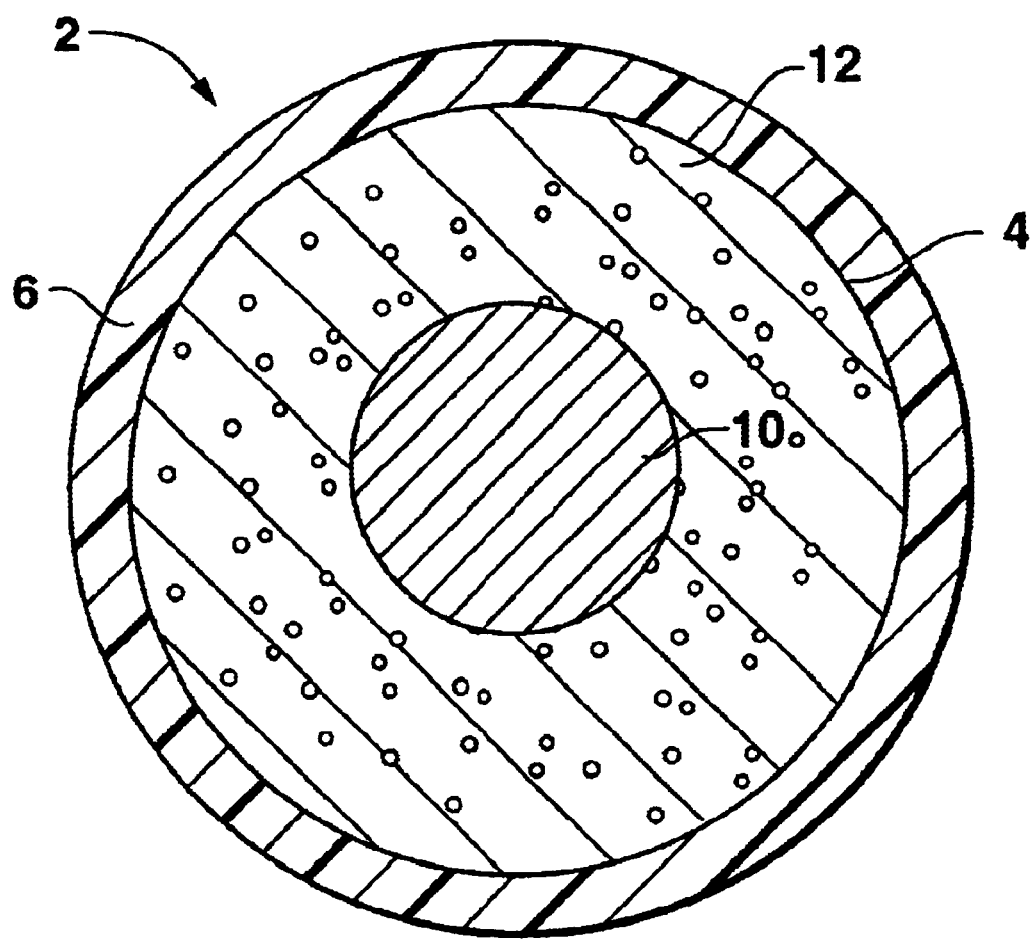

An alternative embodiment of a golf ball core may be seen in reference to FIG. 1B. As seen in reference to FIG. 1B, a smaller inner core 10 is provided of a conventional core polymer mixture which does not have the carbide ceramic or advanced ceramic particulate additive. Around this central core 10, a second core 12 is-molded from the polymer composition set forth in Table 1.

As indicated in FIG. 1B, this arrangement provides an outer core region 12 which is perimeter weighted with the carbide ceramic or advanced ceramic particulate additives. As is appreciated by practioners in the art, the perimeter weighting of the core of either embodiment results in a golf ball having a lower spin rate. This, in turn, equates to a golf ball having a greater flight distance. It is believed that the carbide ceramics or advanced ceramic particulate additives described above will offer similar improvements in a wide range of conventional rubber core compositions.

When formed, the cores described above may be used with any conventional cover to achieve desired performance values. For instance, one suitable cover may be found in reference to U.S. Pat. No. 5,538,794 which is incorporated by reference. This patent, along with the references therein, may be used to provide covers suitable for use with the present core composition.

Using the above formulation and protocols, golf balls having both one-piece and two-piece cores were manufactured and evaluated. The balls produced were found to have a core weight of about 35.0±0.3 grams with a core size of 1.510±0.005 inches. The ATTI compression values range between about 70 to about 80 and have a Shore D hardness values of 50±3.

The core compositions of the present invention may additionally include other conventional modifying ingredients such as fillers, metal oxides, and various cross-linking agents. With respect to the amount of filler, filler amounts are primarily based upon weight restrictions and specific gravity requirements of the total polymer composition in the range from about 15 to about 30 parts by weight on 100 parts elastomer.

An additional aspect of the present invention is to provide a golf ball exhibiting an improved putting performance during soft, low impact putts. Traditional golf balls have a tendency to be deflected from the intended line of travel when the putter face impacts the ball along a dimple edge. The dimple edge contact changes the direction of travel of the golf ball. For instance, a deflection of 5 degrees may cause a deviation along the intended line of travel sufficiently great that a four to five foot putt may be missed.

The present invention addresses this problem by providing a golf ball having dimples with edges with an edge radii of about 0.050 inches to about 0.250 inches and more preferably ranging between 0.075 inches to about 0.150 inches. It has been found that by providing a dimple edge radii in the above ranges to the golf ball, the angle of deflection which results from hitting a dimpled edge may be reduced from 5 degrees to between 1 to 2 degrees. This increase in dimple edge radii, along with a commiserate reduction in the surrounding land area of the golf ball, permits a more accurate and reproducible putt to occur. Further, by making the change to substantially all the dimples on the golf ball it does not require any alignment of a selected portion of the golf ball as taught within the art.

Figure 2:
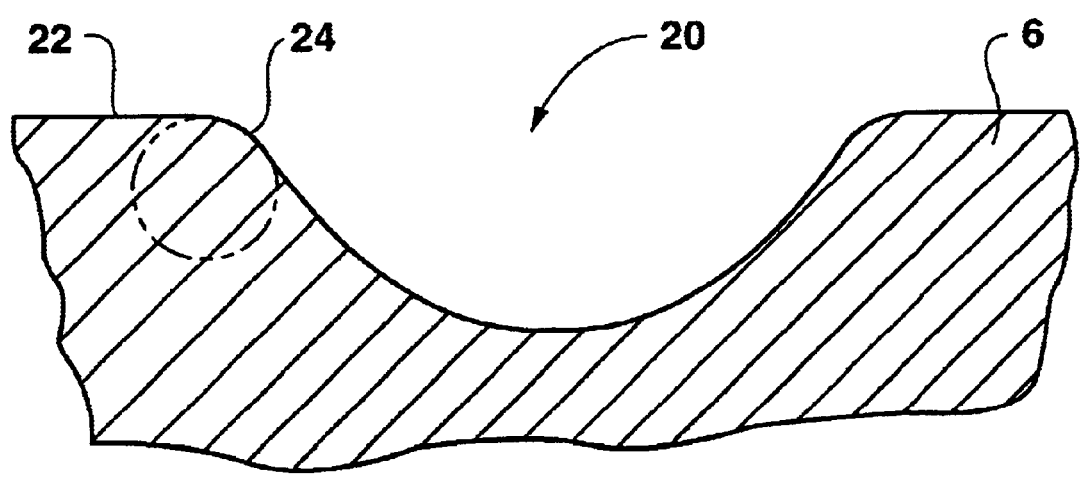
FIG. 2 is a sectional view of a single dimple which illustrates an embodiment of the invention.

As best seen in reference to FIG. 2, a single dimple 20 is illustrated in cross section through cover material 6. Surrounding dimple 20 is a land area 22. As seen, there is a transition region 24 between the dimple 20 and land area 22 which defines a radius as described above. The dashed lines in FIG. 2 indicate the referenced circle from which the radius is determined. By increasing the dimple edge radii, the sharp angled transition between the dimple and the land area is reduced and thereby decreases the probability and extent of deflection attributed to a dimple edge impact by a club head during a soft putt.

Figure 3:
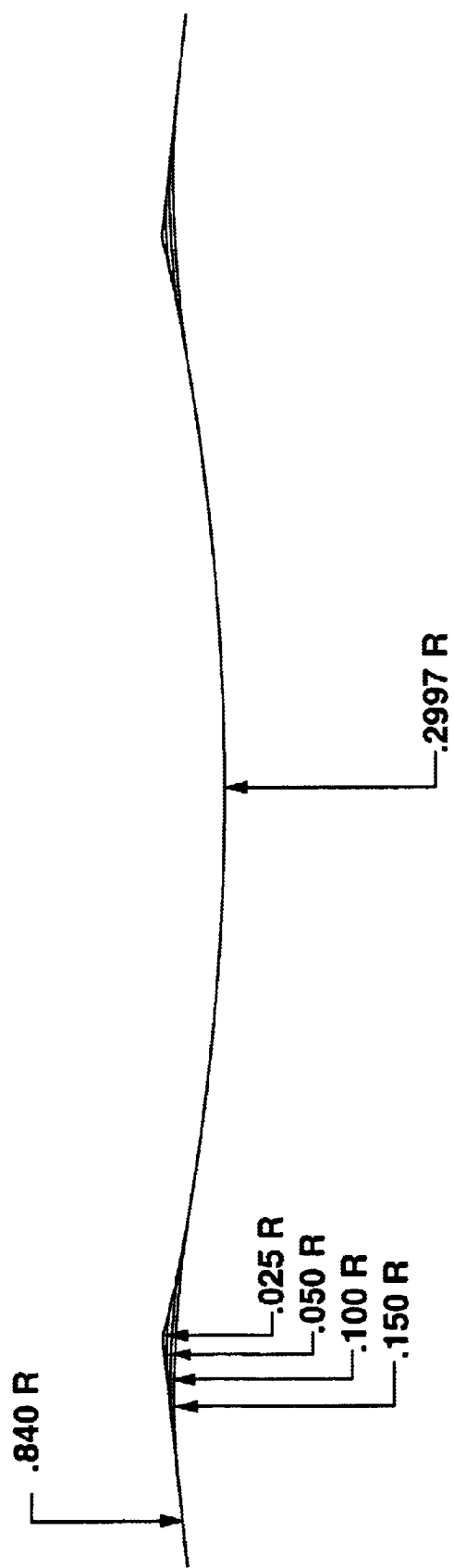
FIG. 3 is a dimple trace pattern of golf balls having a dimple edge radius and shape in accordance with the present invention.

The effect of increasing the dimple edge radii on the balls was initially evaluated by placing a conventional commercial golf ball having an average dimple radii of about 0.025 inches into a surface finishing vibratory device. An abrasive media was used to uniformly remove a portion of the outer cover. The vibratory process thereby reduced the land area and increased the radius of the dimple edges. The removal process was concentrated on the outer dimple wall adjacent the land area in that the transition area between the dimple and the land area was subject to the greatest abrasive action. The effectiveness of the vibratory process was confirmed using a dimple tracing device as is well known within the art and as seen in FIG. 3. From the dimple tracing data as set forth in FIG. 3, the angles of deflection of the various balls during putting were determined in which the improvements stated above were noted.

The desired dimple edge radii and pattern may be directly molded into the golf ball cover using conventional techniques. Changes to the dimple pattern and dimple depth may also be made as needed to bring about other beneficial changes to the golf ball cover that may affect flight distance and trajectory of the golf ball. For any particular ball construction, it is possible to use routine experimentation to alter the radii of the dimple edge and evaluate the alteration upon the deflection angle during putting. Once the desired radii for a particular golf ball is known, a suitable mold can be constructed for commercial production of the balls.

An additional aspect of the present invention, which may be combined with one or more aspects of the other inventive aspects described herein, is directed towards providing a ball which is marked during the manufacturing process with a proper balancing orientation. In accordance with this invention, it has been found that commercially produced golf balls are not uniform with respect to their weight distribution. In other words, a golf ball will have a balance point which can be determined by floating the ball within a liquid medium such as a brine solution. When floated, the ball will assume a floated position in which the heavier hemisphere will be positioned beneath the water line of the floating ball.

Figure 4A:
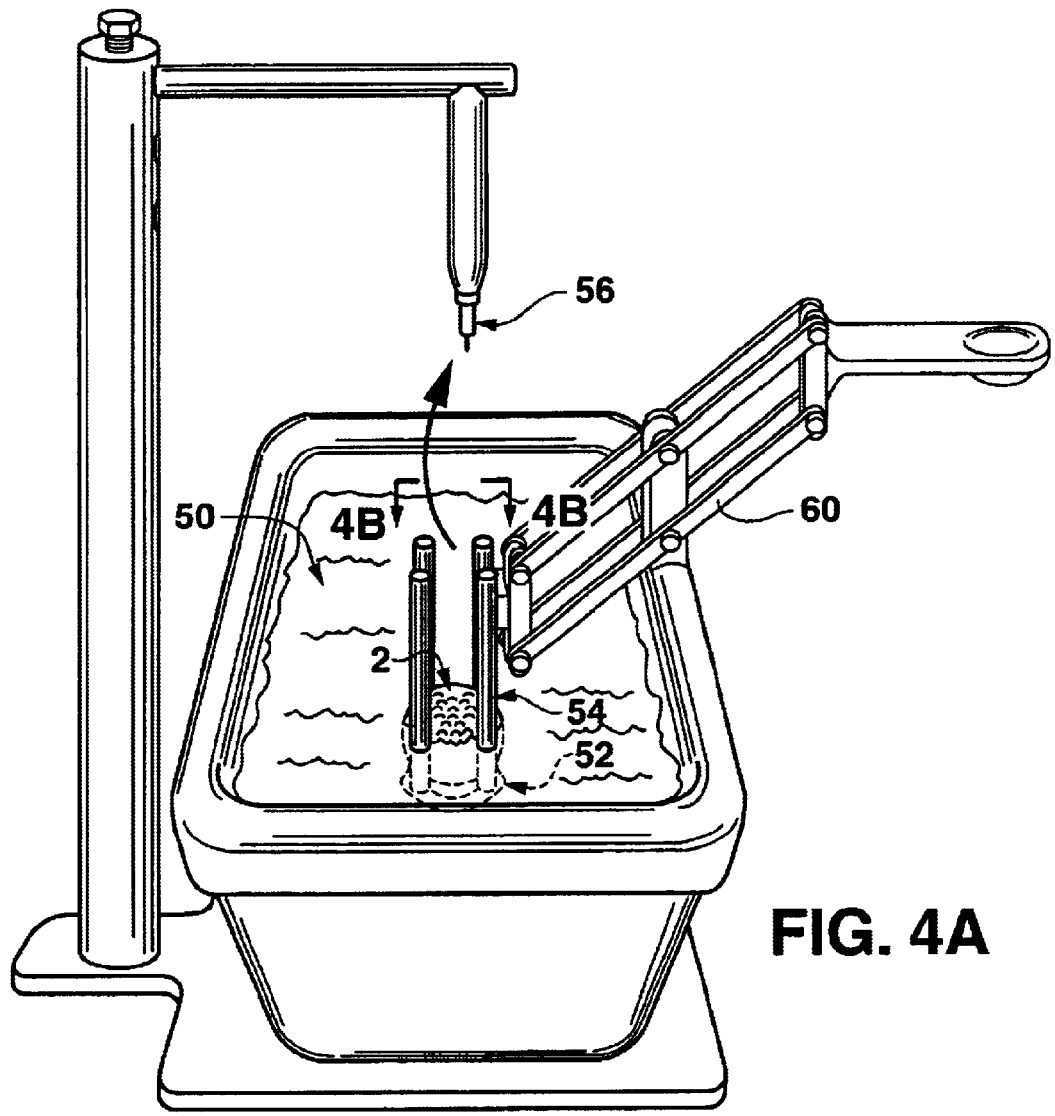
FIGS. 4A and 4B are perspective views illustrating a process of weight balancing and marking a golf ball so that a balance point on the golf ball may be readily determined.
Figure 4B:
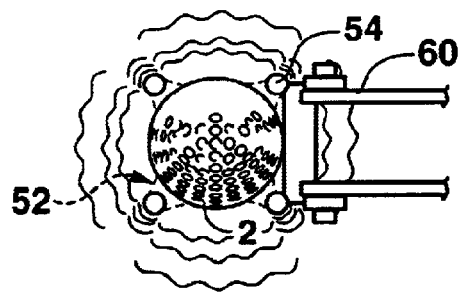

One process of marking the golf ball is seen in reference to FIG. 4. A floating solution 50 is provided in which the solution has a specific gravity sufficient to float the golf ball 2. The ball is placed above a jig 52 which allows the ball to float. The jig 52 is in further communication with a plurality of upright arms 54 which provide a cage-like structure to hold and retain the ball in proper position. Preferably, the jig and arm arrangement has tight tolerances tailored to the individual balls to minimize movement of the ball during the marking process.

When floated, the heaviest portion of the ball (the balance point) will position itself to be the lower most point beneath the surface of the solution. The jig 52 and arm 54 may thereafter be slowly elevated to maintain the floating orientation of the golf ball. Upon being raised above the surface of the solution, an overhead punch 56 may be applied to the uppermost surface of the golf ball so as to make a permanent reference mark or puncture within the cover of the ball. A pivoting arm 60 may be used to lift the ball within the jig 52 and support arms 54 in a substantially vertical manner so as to engage a sharp point on a terminal end of punch 56. It is preferred to use a sharp point so as to make a small, permanent marking within the cover which will provide a permanent reference point following subsequent cleaning and surface preparation of the ball cover. One of the finishing steps may then include providing a marking or other indicia on the ball corresponding to the previously made mark.

By locating the heaviest point of the ball in one position, it allows the golf ball to be marked on the opposite end with an indicia or other marking. This allows the ball to be oriented for putting such that the ball can be oriented with the heaviest portion making contact with the putting green. In this manner, when the ball is putted, the ball has a tendency to roll truer. If a ball is oriented with the heaviest equator along a side of the ball, the slight imbalance will have a tendency to cause the ball to deviate from the intended path. As a result, by knowing the balance position of the ball enables one to orient the ball for putting such that a more accurate and consistent putt results. Accordingly, a truer putting ball can be provided by the process of locating the heavier portion of a ball, marking the opposite end of the ball, and subsequently using the marking to position the golf ball for a putting stroke in which the heaviest end of the ball makes contact with the putting green. In this manner, when struck, the ball has a tendency to roll truer than if the heavier portion or hemisphere of the ball was positioned along an edge of the golf ball.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

That which is claimed is:

1. A golf ball core composition comprising:
   an elastomer selected from polybutadiene elastomers and mixtures of polybutadiene elastomers with other elastomers; and, 3 to 25 percent by weight of a particulate additive having an average particle size of between about 4 to about 500 microns selected from the group consisting of silicon carbide, boron carbide, advanced ceramics of nitride, oxide, boride, carbide, and silicide, and mixtures thereof, said particulate additive being present within an outer radius half of the core in an amount 15 to 20 percent greater than an inner half of said core.

2. The core composition according to claim 1 wherein the particulate additive is present in an amount of between about 10 to about 20 percent by weight.

3. The core composition according to claim 1 wherein the particulate additive is present in an amount of between 8.5 to about 9.0 percent by weight.

4. The core composition according to claim 1 wherein said particulate additive is present in a higher concentration in an outer radius of said core than in an inner radius.

5. The core composition according to claim 1 wherein said core composition is molded around a central core polymer, said central core polymer lacking said particulate additives.

* * * * *